(12) United States Patent
Gara et al.

(10) Patent No.: US 8,275,954 B2
(45) Date of Patent: Sep. 25, 2012

(54) USING DMA FOR COPYING PERFORMANCE COUNTER DATA TO MEMORY

(75) Inventors: Alan Gara, Yorktown Heights, NY (US); Valentina Salapura, Yorktown Heights, NY (US); Robert W. Wisniewski, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 12/684,367

(22) Filed: Jan. 8, 2010

(65) Prior Publication Data

US 2011/0173403 A1    Jul. 14, 2011

(51) Int. Cl.
*G06F 12/00* (2006.01)
(52) U.S. Cl. .............. 711/154; 711/162; 711/E12.001
(58) Field of Classification Search .............. 711/154, 711/162, E12.001, 163, 167
See application file for complete search history.

(56) References Cited

U.S. PATENT DOCUMENTS

| 2009/0150893 A1* | 6/2009 | Johnson et al. | 718/104 |
| 2009/0327533 A1* | 12/2009 | Kallam et al. | 710/25 |
| 2010/0083038 A1* | 4/2010 | Pierce et al. | 714/5 |
| 2011/0061050 A1* | 3/2011 | Sahita et al. | 718/1 |

OTHER PUBLICATIONS

RD 481001 A, May 2004, Moore et al.*

* cited by examiner

*Primary Examiner* — Pierre-Michel Bataille
(74) *Attorney, Agent, or Firm* — Scully, Scott, Murphy & Presser, P.C.; Daniel P. Morris, Esq.

(57) ABSTRACT

A device for copying performance counter data includes hardware path that connects a direct memory access (DMA) unit to a plurality of hardware performance counters and a memory device. Software prepares an injection packet for the DMA unit to perform copying, while the software can perform other tasks. In one aspect, the software that prepares the injection packet runs on a processing core other than the core that gathers the hardware performance counter data.

15 Claims, 4 Drawing Sheets

USING DMA FOR COPYING PERFORMANCE COUNTER DATA TO MEMORY

STATEMENT REGARDING FEDERALLY SPONSORED RESEARCH OR DEVELOPMENT

This invention was made with Government support under Contract No.: B554331 awarded by Department of Energy. The Government has certain rights in this invention.

CROSS-REFERENCE TO RELATED APPLICATIONS

The present invention is related to the following commonly-owned, co-pending United States Patent Applications filed on even date herewith, the entire contents and disclosure of each of which is expressly incorporated by reference herein as if fully set forth herein. U.S. patent application Ser. No. 12/684,172, filed Jan. 8, 2010, for "HARDWARE SUPPORT FOR COLLECTING PERFORMANCE COUNTERS DIRECTLY TO MEMORY"; U.S. patent application Ser. No. 12/684,190, filed Jan. 8, 2010, for "HARDWARE ENABLED PERFORMANCE COUNTERS WITH SUPPORT FOR OPERATING SYSTEM CONTEXT SWITCHING"; U.S. patent application Ser. No. 12/684,496, filed Jan. 8, 2010, for "HARDWARE SUPPORT FOR SOFTWARE CONTROLLED FAST RECONFIGURATION OF PERFORMANCE COUNTERS"; U.S. patent application Ser. No. 12/684,429, filed Jan. 8, 2010, for "HARDWARE SUPPORT FOR SOFTWARE CONTROLLED FAST MULTIPLEXING OF PERFORMANCE COUNTERS"; U.S. patent application Ser. No. 12/697,799, filed on Feb. 1, 2010, for "CONDITIONAL LOAD AND STORE IN A SHARED CACHE"; U.S. patent application Ser. No. 12/684,738, filed Jan. 8, 2010, for "DISTRIBUTED PERFORMANCE COUNTERS"; U.S. patent application Ser. No. 61/261,269, filed Nov. 13, 2009, for "LOCAL ROLLBACK FOR FAULT-TOLERANCE IN PARALLEL COMPUTING SYSTEMS"; U.S. patent application Ser. No. 12/684,860, filed Jan. 8, 2010, for "PAUSE PROCESSOR HARDWARE THREAD UNTIL PIN"; U.S. patent application Ser. No. 12/684,174, filed Jan. 8, 2010, for "PRECAST THERMAL INTERFACE ADHESIVE FOR EASY AND REPEATED, SEPARATION AND REMATING"; U.S. patent application Ser. No. 12/684,184, filed Jan. 8, 2010, for "ZONE ROUTING IN A TORUS NETWORK"; U.S. patent application Ser. No. 12/684,852, filed Jan. 8, 2010, for "PROCESSOR RESUME UNIT"; U.S. patent application Ser. No. 12/684,642, filed Jan. 8, 2010, for "TLB EXCLUSION RANGE"; U.S. patent application Ser. No. 12/684,804, filed Jan. 8, 2010, for "DISTRIBUTED TRACE USING CENTRAL PERFORMANCE COUNTER MEMORY"; U.S. patent application Ser. No. 13/008,602, filed Jan. 18, 2011, for "CACHE DIRECTORY LOOKUP READER SET ENCODING FOR PARTIAL CACHE LINE SPECULATION SUPPORT"; U.S. patent application Ser. No. 61/293,237, filed Jan. 8, 2010, for "ORDERING OF GUARDED AND UNGUARDED STORES FOR NO-SYNC I/O"; U.S. patent application Ser. No. 12/693,972, filed Jan. 26, 2010, for "DISTRIBUTED PARALLEL MESSAGING FOR MULTIPROCESSOR SYSTEMS"; U.S. patent application Ser. No. 12/688,747, filed Jan. 15, 2010, for "SUPPORT FOR NON-LOCKING PARALLEL RECEPTION OF PACKETS BELONGING TO A SINGLE MEMORY RECEPTION FIFO"; U.S. patent application Ser. No. 12/688,773, filed Jan. 15, 2010, for "OPCODE COUNTING FOR PERFORMANCE MEASUREMENT"; U.S. patent application Ser. No. 12/684,776, filed Jan. 8, 2010, for "MULTI-INPUT AND BINARY REPRODUCIBLE, HIGH BANDWIDTH FLOATING POINT ADDER IN A COLLECTIVE NETWORK"; U.S. patent application Ser. No. 13/004,007, filed Jan. 10, 2011, for "MULTI-PETASCALE HIGHLY EFFICIENT PARALLEL SUPERCOMPUTER"; U.S. patent application Ser. No. 12/984,252, filed Jan. 4, 2011, for "CACHE WITHIN A CACHE"; U.S. patent application Ser. No. 13/008,502, filed Jan. 18, 2011, for "MULTIPROCESSOR SYSTEM WITH MULTIPLE CONCURRENT MODES OF EXECUTION"; U.S. patent application Ser. No. 13/008,583, filed Jan. 18, 2011, for "READER SET ENCODING FOR DIRECTORY OF SHARED CACHE MEMORY IN MULTIPROCESSOR SYSTEM"; U.S. patent application Ser. No. 12/984,308 filed on Jan. 4, 2011, for "EVICT ON WRITE, A MANAGEMENT STRATEGY FOR A PREFETCH UNIT AND/OR FIRST LEVEL CACHE IN A MULTIPROCESSOR SYSTEM WITH SPECULATIVE EXECUTION"; U.S. patent application Ser. No. 12/984,329 filed Jan. 4, 2011, for "PHYSICAL ALIASING FOR THREAD LEVEL SPECULATION WITH A SPECULATION BLIND CACHE"; U.S. patent application Ser. No. 61/293,552, filed Jan. 8, 2010, for "LIST BASED PREFETCH"; U.S. patent application Ser. No. 12/684,693, filed Jan. 8, 2010, for "PROGRAMMABLE STREAM PREFETCH WITH RESOURCE OPTIMIZATION"; U.S. patent application Ser. No. 13/004,005, filed Jan. 10, 2011, for "NON-VOLATILE MEMORY FOR CHECKPOINT STORAGE"; U.S. patent application Ser. No. 61/293,476, filed Jan. 8, 2010, for "NETWORK SUPPORT FOR SYSTEM INITIATED CHECKPOINTS"; U.S. patent application Ser. No. 12/696,746, filed on Jan. 29, 2010, for "TWO DIFFERENT PREFETCH COMPLEMENTARY ENGINES OPERATING SIMULTANEOUSLY"; U.S. patent application Ser. No. 12/697,015, filed on Jan. 29, 2010, for "DEADLOCK-FREE CLASS ROUTES FOR COLLECTIVE COMMUNICATIONS EMBEDDED IN A MULTI-DIMENSIONAL TORUS NETWORK"; U.S. patent application Ser. No. 61/293,559, filed Jan. 8, 2010, for "RELIABILITY AND PERFORMANCE OF A SYSTEM-ON-A-CHIP BY PREDICTIVE WEAR-OUT BASED ACTIVATION OF FUNCTIONAL COMPONENTS"; U.S. patent application Ser. No. 12/727,984, filed Mar. 19, 2010, for "EFFICIENCY OF STATIC CORE TURN-OFF IN A SYSTEM-ON-A-CHIP WITH VARIATION"; U.S. patent application Ser. No. 12/697,043, Jan. 29, 2010, for "IMPLEMENTING ASYNCHRONOUS COLLECTIVE OPERATIONS IN A MULTI-NODE PROCESSING SYSTEM"; U.S. patent application Ser. No. 13/008,546, filed Jan. 18, 2011, for "ATOMICITY: A MULTI-PRONGED APPROACH"; U.S. patent application Ser. No. 12/697,175, filed Jan. 29, 2010 for "I/O ROUTING IN A MULTIDIMENSIONAL TORUS NETWORK"; U.S. patent application Ser. No. 12/684,287, filed Jan. 8, 2010 for ARBITRATION IN CROSSBAR FOR LOW LATENCY; U.S. patent application Ser. No. 12/684,630, filed Jan. 8, 2010, for "EAGER PROTOCOL ON A CACHE PIPELINE DATAFLOW"; U.S. patent application Ser. No. 12/723,277, filed Mar. 12, 2010 for EMBEDDED GLOBAL BARRIER AND COLLECTIVE IN A TORUS NETWORK; U.S. patent application Ser. No. 12/696,764, filed Jan. 29, 2010 for "GLOBAL SYNCHRONIZATION OF PARALLEL PROCESSORS USING CLOCK PULSE WIDTH MODULATION"; U.S. patent application Ser. No. 12/796,411, filed Jun. 8, 2010 for "GENERATION-BASED MEMORY SYNCHRONIZATION IN A MULTIPROCESSOR SYSTEM WITH WEAKLY CONSISTENT MEMORY ACCESSES"; U.S. patent application Ser. No. 12/796,389, filed Jun. 8, 2010 for BALANCING WORKLOAD IN A MULTIPROCESSOR SYSTEM RESPONSIVE TO PROGRAMMABLE ADJUSTMENTS IN A SYNCHRONIZATION INSTRUCTION; U.S. patent application Ser. No. 12/696,817, filed Jan. 29, 2010 for HEAP/STACK GUARD PAGES USING A WAKEUP UNIT; U.S. patent application Ser. No. 61/293,603, filed Jan. 8, 2010 for MECHANISM OF SUPPORTING SUB-COMMUNICATOR COLLECTIVES WITH O(64) COUNTERS AS OPPOSED TO ONE COUNTER FOR EACH SUB-COMMUNICATOR; and U.S. patent application Ser. No. 12/774,475, filed May 5, 2010 for "REPRODUCIBILITY IN A MULTIPROCESSOR SYSTEM".

FIELD OF THE INVENTION

The present disclosure relates generally to performance counters, and more particularly to hardware support for efficiently copying performance counter data to memory.

BACKGROUND

Understanding the performance of programs running on today's chips is complicated. Programs themselves are becoming increasingly complex and intertwined with a growing number of layers in the software stack. Hardware chips are also becoming more complex. The current generation of chips is multicore and the next generation will likely have even more cores and will include networking, switches, and other components integrated on to the chip.

Performance counters can help programmers address the challenges created by the above complexity by providing insight into what is happening throughout the chip, in the functional units, in the caches, and in the other components on the chip. Performance counter data also helps programmers understand application behavior. Chips have incorporated performance counters for several generations, and software ecosystems have been designed to help analyze the data provided by such counters.

Hardware performance counters provide insight into the behavior of the various aspects of a chip. Generally, hardware performance counters are extra logic added to the central processing unit (CPU) to track low-level operations or events within the processor. For example, there are counter events that are associated with the cache hierarchy that indicate how many misses have occurred at L1, L2, and the like. Other counter events indicate the number of instructions completed, number of floating point instructions executed, translation lookaside buffer (TLB) misses, and others. Depending on the chip, there are different numbers of counters available that provide information about the chip. However, most chip architectures only allow a small subset of these potential counters to be counted simultaneously. Among the limitations of performance counters are the number of counters that may be gathered simultaneously and the rate at which the data may be gathered.

There are several engineering reasons why it is difficult to gather a large number of counters. One is that some of the useful data originates in areas of the chip where area is a very scarce resource. Another reason is that trying to provide paths and multiplexers to export many counters takes power and area that is not available. Counters themselves are implemented as latches, and a large number of large counters require large area and power. What is needed is an efficient mechanism to best utilize the limited performance counters that are available.

Software uses the values from performance counters. To get these values, performance counters have to explicitly be read out. Depending where the counters are located, they are read out either as a set of registers, or as a set of memory locations (memory mapped registers—MMRs). The code to read the counters implements one load instruction for each read request for each counter. For a system with larger number of counters, and/or where the counter access latency is large, reading out all counters will have longer latency and will block the processor handling this function call during that time.

BRIEF SUMMARY

A device and method for copying performance counter data are provided. The device, in one aspect, may include at least one processor core, a memory, and a plurality of hardware performance counters operable to collect counts of selected hardware-related activities. A direct memory access unit includes a DMA controller operable to copy data between the memory and the plurality of hardware performance counters. An interconnecting path connects the processor core, the memory, the plurality of hardware performance counters, and the direct memory access unit.

A method of copying performance counter data, in one aspect, may include establishing a path between a direct memory access unit to a plurality of hardware performance counter units, the path further connecting to a memory device. The method may also include initiating a direct memory access unit to copy data between the plurality of hardware performance counter units and the memory device.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A mechanism for transferring the performance counter data between the performance counters and memory provided in the present disclosure may be efficient and non-obtrusive. At the outset, it should be understood that while the description herein refers to multicore chips, the mechanism of the present disclosure is not limited to work only on multicore chips, and is not dependent on the number of cores or processors a chip may have. For example, the mechanism of the present disclosure may apply to a single processor, a uniprocessor chip, and others.

Multicore chips are those computer chips with more than a single core. The extra cores may be used to offload the work of setting up a transfer of data between the performance counters and memory without perturbing the data being generated from the running application. A direct memory access (DMA) mechanism allows software to specify a range of memory to be copied from and to, and hardware to copy all of the memory in the specified range. Many chip multiprocessors (CMP) and systems on a chip (SoC) integrate a DMA unit. The DMA engine is typically used to facilitate data transfer between network devices and the memory, or between I/O devices and memory, or between memory and memory.

Many chip architectures include a performance monitoring unit (PMU). This unit contains a number of performance counters that count a number of events in the chip. The performance counters are typically programmable to select particular events to count. This unit can count events from some or all of the processors and from other components in the system, such as the memory system, or the network system.

If software wants to use the values from performance counters, it has to read performance counters. Counters are read out using a software program which reads the memory area where performance counters are mapped by reading counters sequentially. For a system with large number of counters or with large counter access latency, executing the code to get these counter values has a substantial impact on program performance.

The mechanism of the present disclosure combines hardware and software that allows for efficient, non-obtrusive movement of hardware performance counter data between the registers that hold that data and a set of memory locations. To be able to utilize a hardware DMA unit available on the chip for copying performance counters into the memory, the hardware DMA unit is connected via paths to the hardware performance counters and registers. The DMA is initialized to perform data copy in the same way it is initialized to perform the copy of any other memory area, by specifying the starting source address, the starting destination address, and the data size of data to be copied. By offloading data copy from a processor to the DMA engine, the data transfer may occur without disturbing the core on which the measured computation or operation (i.e., monitoring and gathering performance counter data) is occurring.

A register/memory location provides the start memory location of the first destination memory address. For example, the software, or an operating system, or the like pre-allocates memory area to provide space for writing and storing the performance counter data. Additional register and/or memory location provides the start memory location of the first source memory address. This source address corresponds to the memory address of the first performance counter to be copied. Additional register and/or memory location provides the size of data to be copied, or number of performance counters to be copied.

On a multicore chip, for example, the software running on an extra core, i.e., one not dedicated to gather performance data, may decide which of the performance counters to copy, utilize the DMA engine by setting up the copy, initiate the copy, and then proceed to perform other operations or work.

Figure 1:
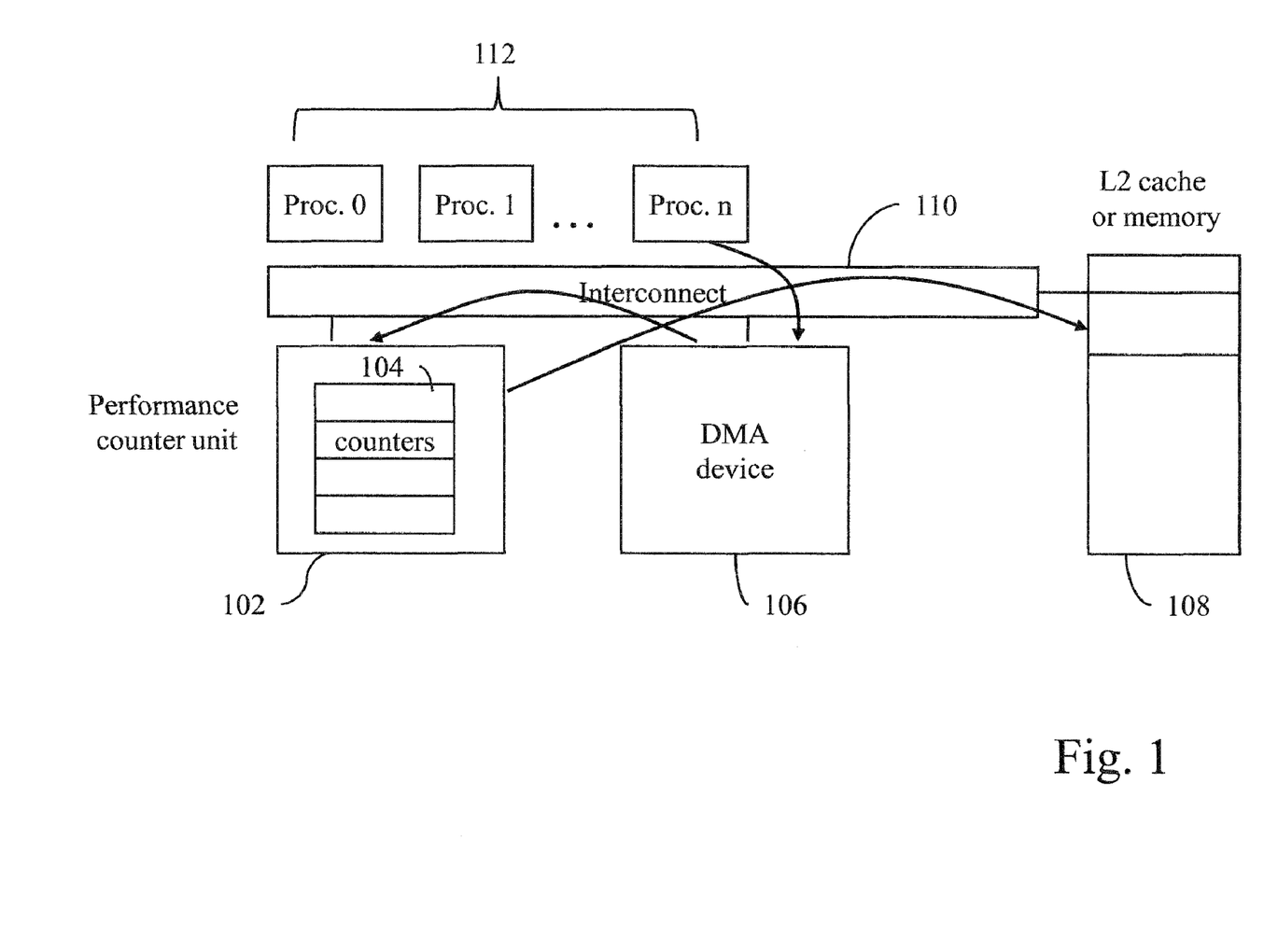
FIG. 1 illustrates an architectural diagram showing using DMA for copying performance counter data to memory.

FIG. 1 illustrates an architectural diagram showing using DMA for copying performance counter data to memory. DMA unit 106, performance counter unit 102, and L2 cache or another type of memory device 108 are connected on the same interconnect 110. A performance counter unit 102 may be built into a microprocessor and includes a plurality of hardware performance counters 104, which are registers used to store the counts of hardware-related activities within a computer. Examples of activities of which the counters 104 may store counts may include, but are not limited to, cache misses, translation lookaside buffer (TLB) misses, the number of instructions completed, number of floating point instructions executed, processor cycles, input/output (I/O) requests, and other hardware-related activities and events. A memory device 108, which may be an L2 cache or other memory, stores various data related to the running of the computer system and its applications.

Both the performance counter unit 102 and the memory 108 are accessible from the DMA unit 106. An operating system or software may allocate an area in memory 108 for storing the counter data of the performance counters 104. The operating system or software may decide which performance counter data to copy, whether the data is to be copied from the performance counters 104 to the memory 108 or the memory 108 to the performance counters 104, and may prepare a packet for DMA and inject the packet into the DMA unit 106, which initiates memory-to-memory copy, i.e., between the counters 104 and memory 108. In one aspect, the control packet for DMA may contain a packet type identification, which specifies that this is a memory-to-memory transfer, a starting source address of data to be copied, size in bytes of data to be copied, and a destination address where the data are to be copied. The source addresses may map to the performance counter device 102, and destination address may map to the memory device 108 for data transfer from the performance counters to the memory.

In another aspect, data transfer can be performed in both directions, not only from the performance counter unit to the memory, but also from the memory to the performance counter unit. Such a transfer may be used for restoring the value of the counter unit, for example.

Multiple cores 112 may be running different processes, and in one aspect, the software that prepares the DMA packet and initiates the DMA data transfer may be running on a core that is separate from the process running on another core that is gathering the hardware performance monitoring data. In this way, the core running a measure computation, i.e., that gathers the hardware performance monitoring data, need not be disturbed or interrupted to perform the copying to and from the memory 108.

Figure 2:
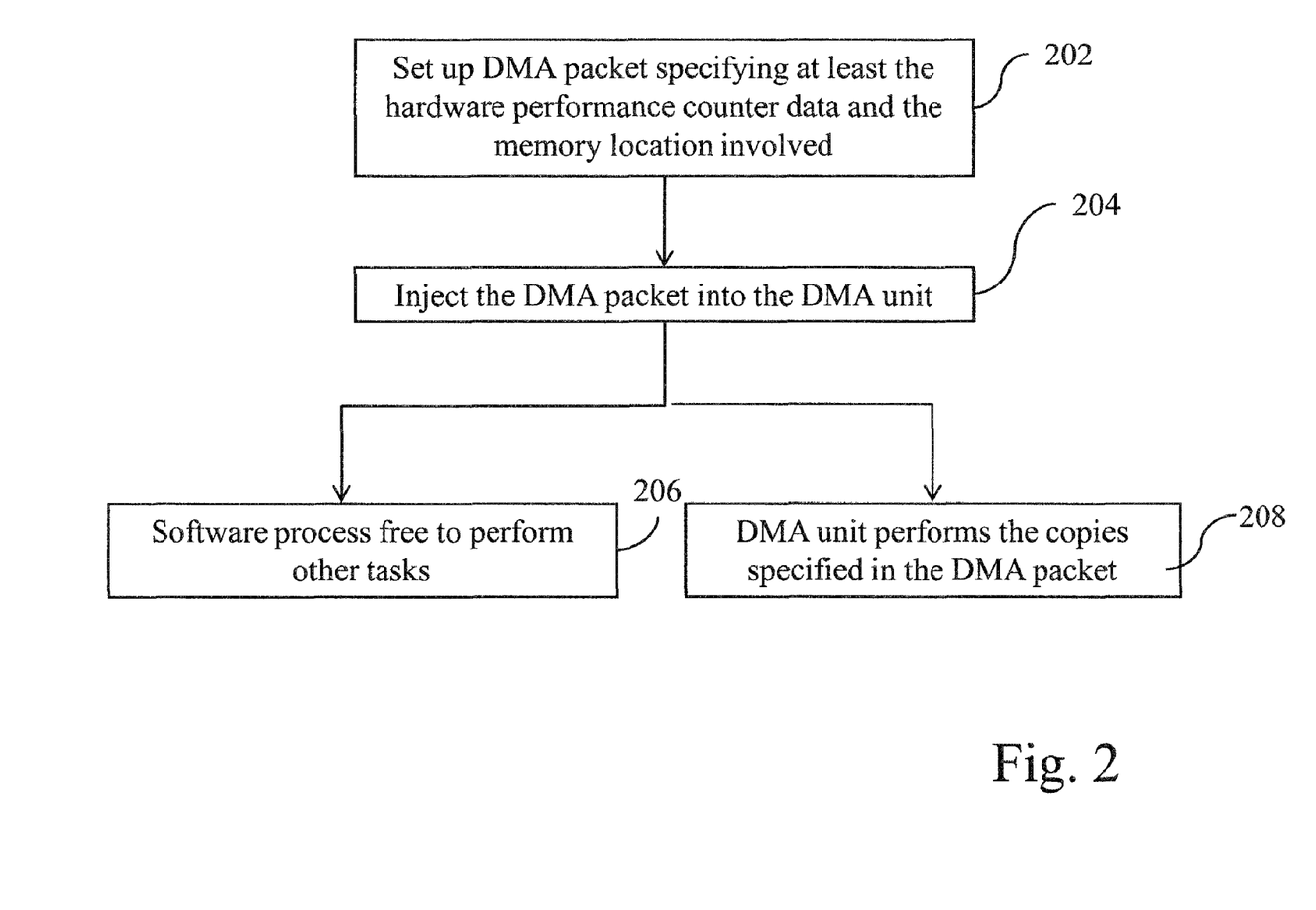
FIG. 2 is a flow diagram illustrating a method for using DMA for copying performance counter data to memory.

FIG. 2 is a flow diagram illustrating a method for using DMA for copying performance counter data to memory. At 202, software sets up a DMA packet that specifies at least which performance counters are involved in copying, the memory location in memory device that is involved in copying. At 204, the software injects the DMA packet into the DMA unit, which invokes the DMA unit to perform the specified copy. At 206, the software is free to perform its other tasks. At 208, asynchronous to the software performing other tasks, the DMA unit performs the instructed copy between the performance counters and the memory as directed in the DMA packet. In one embodiment, the software that prepares and injects the DMA packet runs on one core on a microprocessor, and is a separate process from the process that may be gathering the measurement data for the performance counters, which may be running on a different core.

Figure 3:
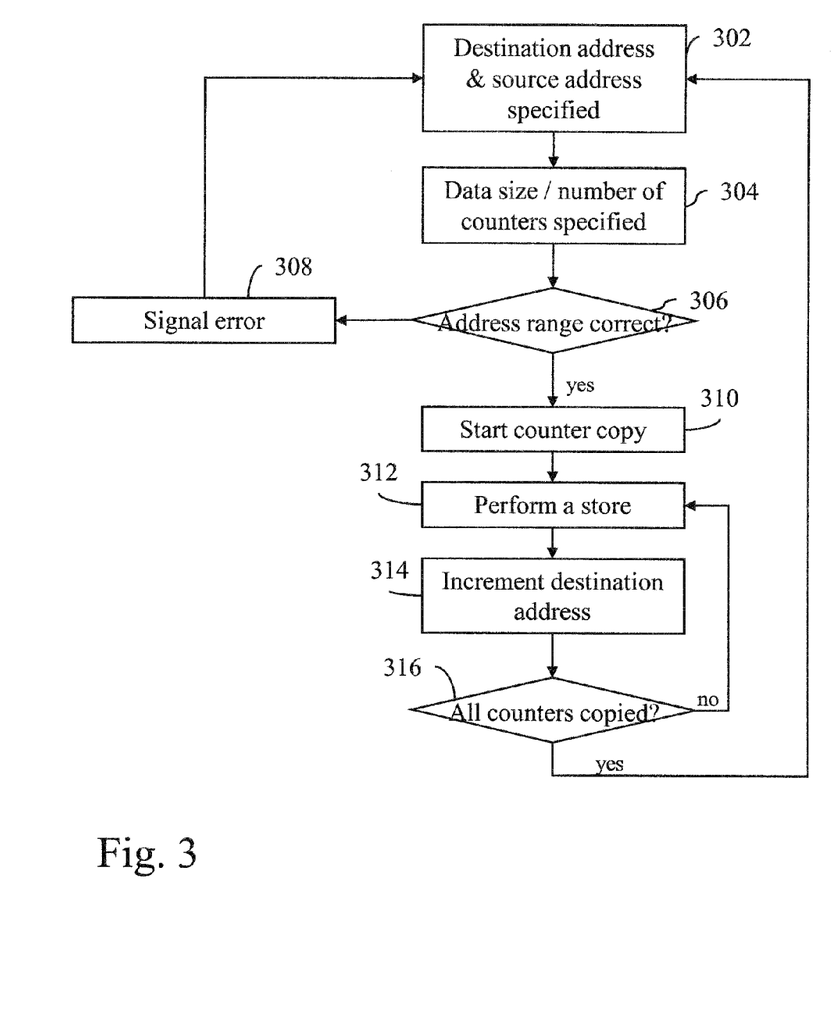
FIG. 3 is a flow diagram illustrating a method for using DMA for copying performance counter data to memory in another aspect.

FIG. 3 is a flow diagram illustrating a method for using DMA for copying performance counter data to memory in another aspect. At 302, destination address and source address are specified. The operating system or another software may specify the destination address and source address, for example, in a DMA packet. At 304, data size and number of counters are specified. Again, the operating system or another software may specify the data size and number of counters to copy in the DMA packet. At 306, a DMA device checks the address range specified in the packet and if not correct, an error signal is generated at 308. The DMA device then waits for next packet. If the address range is correct at 306, the DMA device starts copying the counter data at 310. At 312, the DMA device performs a store to the specified memory address. At 314, the destination address is incremented by the length of counter data copied. At 316, if not all counters have been copied, the control returns to 312 to perform the next copy. If all counters have been copied, the control returns to 302.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
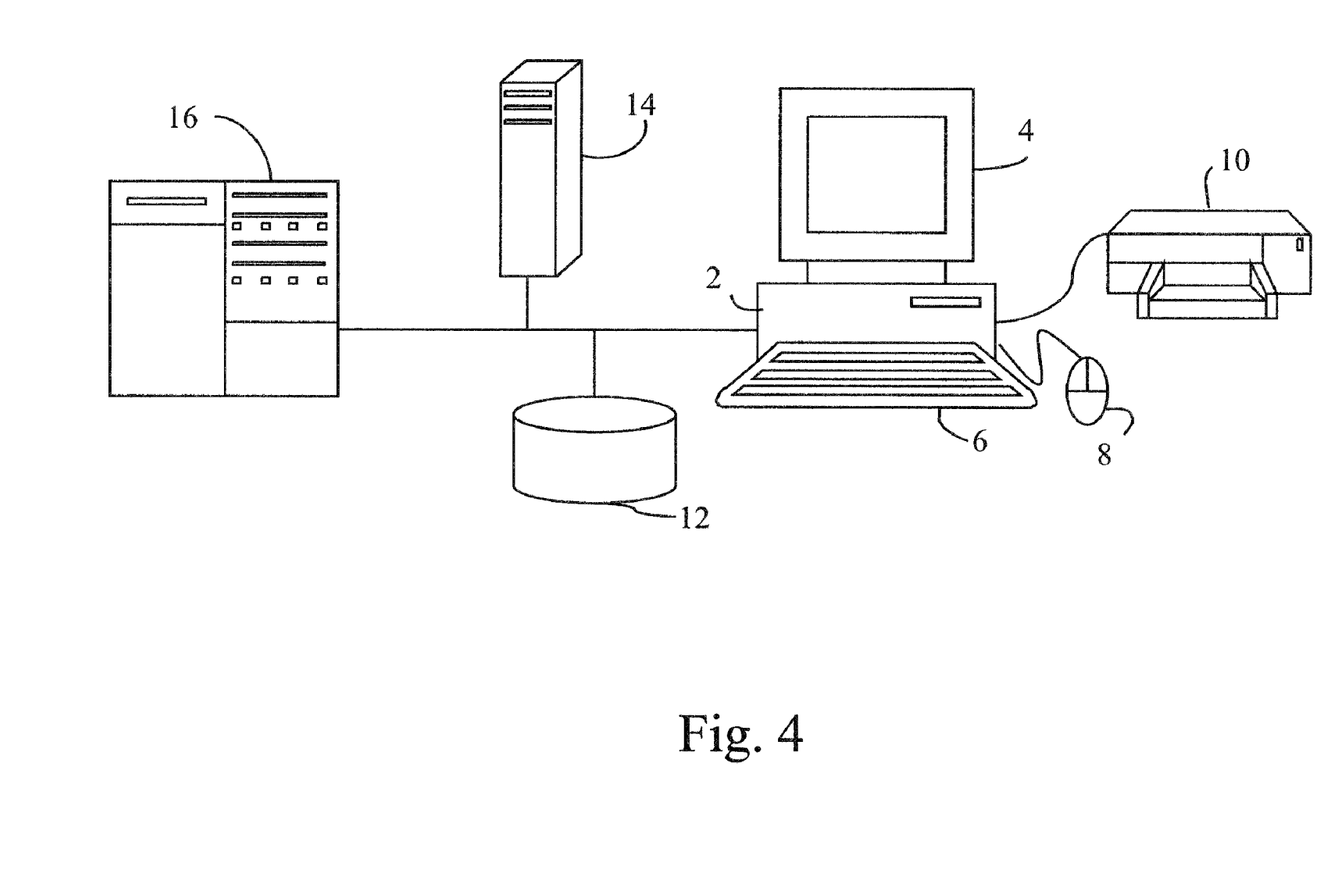
FIG. 4 illustrates an example of a computer system, in which the systems and methodologies of the present disclosure may be carried out or executed.

Referring now to FIG. 4, the systems and methodologies of the present disclosure may be carried out or executed in a computer system that includes a processing unit 2, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 2 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 4 for presenting output displays and providing a display through which the user may input data and interact with the processing system, for instance, in cooperation with input devices such as the keyboard 6 and mouse device 8 or pointing device. The computer processing system may be also connected or coupled to one or more peripheral devices such as the printer 10, scanner (not shown), speaker, and any other devices, directly or via remote connections. The computer processing system may be connected or coupled to one or more other processing systems such as a server 10, other remote computer processing system 14, network storage devices 12, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 2, 14, 16), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of copying performance counter data, comprising:
    establishing a path between a direct memory access unit to a plurality of hardware performance units, the path further connecting to a memory device; and
    initiating a direct memory access unit to copy data between the plurality of hardware performance units and the memory device,
    wherein the initiating a direct memory access unit to copy data include injecting a packet to the direct memory access unit and wherein the packet includes destination address, source address, data size and number of hardware performance counters from which to copy data or to which to copy data.

2. The method of claim 1, further including:
    software setting up a DMA injection packet to initiate the direct memory access unit for copying.

3. The method of claim 1, wherein the direct memory access unit operates independently of software running on a plurality of cores.

4. The method of claim 1, wherein software runs on a plurality of processing cores, while another processing core separate from the plurality of processing cores is responsible for gathering hardware performance counter data.

5. The method of claim 1, wherein the direct memory access unit copies data from one or more of the plurality of hardware performance units to the memory device.

6. The method of claim 1, wherein the direct memory access unit copies data from the memory device to the one or more of the plurality of hardware performance units.

7. A device for copying performance counter data, comprising:
- at least one processing core;
- a memory;
- a plurality of hardware performance counters operable to collect counts of selected hardware-related activities;
- a direct memory access unit having a DMA controller operable to copy data between the memory and the plurality of hardware performance counters; and
- an interconnecting path connecting the processing core, the memory, the plurality of hardware performance counters, and the direct memory access unit,
- wherein a packet is injected to the direct memory access unit to initiate the direct memory access unit to copy data and wherein the packet includes destination address, source address, data size and number of hardware performance counters from which to copy data or to which to copy data.

8. The device of claim 7, wherein software running on the processing core sets up a DMA injection packet and initiates the DMA controller to copy data between one or more of the plurality of hardware performance counters and the memory.

9. The device of claim 8, wherein the DMA controller provides for copying data from the memory to one or more of the plurality of hardware performance counters.

10. The device of claim 8, wherein the DMA injection packet includes at least a memory address of the memory and one or more of the plurality of hardware performance counters.

11. The device of claim 8, wherein the DMA unit operates independently of the software after the software initiates the DMA controller.

12. The device of claim 8, wherein the device includes a plurality of processing cores operable to run software and one of the plurality of processing cores is operable for gathering hardware performance counter data.

13. A non-transitory computer readable storage medium storing a program of instructions executable by a machine to perform a method copying performance counter data, comprising:
- establishing a path between a direct memory access unit to a plurality of hardware performance units, the path further connecting to a memory device; and
- initiating a direct memory access unit to copy data between the plurality of hardware performance units and the memory device,
- wherein the initiating a direct memory access unit to copy data include injecting a packet to the direct memory access unit and wherein the packet includes destination address, source address, data size and number of hardware performance counters from which to copy data or to which to copy data.

14. The computer readable storage medium of claim 13, further including:
- software setting up a DMA injection packet to initiate the direct memory access unit for copying.

15. The computer readable storage medium of claim 14, wherein the software runs on one processing core, while another processing core is responsible for gathering hardware performance counter data.

* * * * *